(12) United States Patent
Nishimura

(10) Patent No.: US 6,173,020 B1
(45) Date of Patent: Jan. 9, 2001

(54) DEMODULATION CIRCUIT INCLUDING ERROR CORRECTION

(75) Inventor: Osami Nishimura, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/237,351

(22) Filed: Jan. 26, 1999

(30) Foreign Application Priority Data

Jan. 28, 1998 (JP) .................................................. 10-015669

(51) Int. Cl.$^7$ .................................................. H04L 27/06
(52) U.S. Cl. .......................... 375/341; 375/324; 714/795
(58) Field of Search .................................. 375/340, 341, 375/324; 714/786, 795

(56) References Cited

U.S. PATENT DOCUMENTS

| | | | |
|---|---|---|---|
| 5,412,686 | * 5/1995 | Ling | 375/130 |
| 5,450,453 | * 9/1995 | Frank | 375/130 |
| 5,502,713 | * 3/1996 | Lagerqvist et al. | 370/17 |
| 5,583,886 | * 12/1996 | Rohani et al. | 375/227 |

FOREIGN PATENT DOCUMENTS

| | | |
|---|---|---|
| 2-53330 | 2/1990 | (JP) . |
| 2-159126 | 6/1990 | (JP) . |
| 5-344002 | 12/1993 | (JP) . |

\* cited by examiner

*Primary Examiner*—Temesghen Ghebretinsae
(74) *Attorney, Agent, or Firm*—Sughrue, Mion, Zinn, Macpeak & Seas, PLLC

(57) ABSTRACT

A demodulation circuit including error correction based on convolution coding and Viterbi decoding by which the characteristic of error correction is further improved. The demodulation circuit including error correction demodulates a burst data signal received in a satellite communication channel having a low carrier power to noise power ratio using reference bits, the reference bits are removed from the demodulated burst data, the burst data are deinterleaved, from which the reference bits have been removed, in accordance with specifications, and Viterbi decoding decodes convolutionally coded burst data, and weighting includes each value of the demodulated burst data in accordance with the distance from the reference bits of the burst data.

19 Claims, 2 Drawing Sheets

DEMODULATION CIRCUIT INCLUDING ERROR CORRECTION

BACKGROUND OF THE INVENTION

1. Field of the Invention

This invention relates to a demodulation circuit including error correction for satellite communication, and more particularly to a demodulation circuit which performs error correction for a channel having a low carrier power to noise power ratio in mobile radio communication.

2. Description of the Related Art

For a demodulation circuit including error correction for a received signal in satellite communication, various demodulation algorithms have been investigated to improve the characteristic in error correction because the received radio wave is very weak. Demodulation circuits including error correction which are based on the demodulation algorithms have been developed. Among them, a demodulation circuit including error correction based on convolutional coding and Viterbi decoding is popularly used. The demodulation circuit has a strong error correction function as a demodulation circuit including error correction and improves the bit error ratio of a received signal significantly.

FIG. 1 is a view showing a construction of a conventional modulation-demodulation circuit including error correction based on convolutional coding and Viterbi decoding. Referring to FIG. 1, modulation circuit 100 includes convolutional coder 101, interleaver 102, reference bit inserter 103, and modulator (for example, a BPSK modulator) 104. Demodulation circuit 200 includes demodulator (for example, a BPSK demodulator) 201, reference bit remover 202, deinterleaver 203, and Viterbi decoder 204.

Now, operation of modulation circuit 100 is described. Convolutional coder 101 convolutionally codes an input burst data signal. Interleaver 102 interleaves the convolutionally coded data in accordance with specifications. Reference bit inserter 103 delimits the interleaved data at predetermined intervals and inserts reference bits in order to assure a high degree of accuracy in demodulation of a received signal. The reference bits are used as reference information to the phase and the amplitude. Modulator 104, for example, BPSK converts an output of reference bit inserter 103 and outputs a resulting signal as a transmission signal.

Next, operation of demodulation circuit 200 is described. Demodulator 201 demodulates a received burst data signal using the reference bits by, for example, BPSK demodulation. Reference bit remover 202 removes the reference bits from the demodulated burst data. Deinterleaver 203 performs deinterleaving by which the data are re-arranged (deinterleaved) in accordance with specifications corresponding to those of the interleaving of the modulator, and outputs the deinterleaved data to Viterbi decoder 204. Viterbi decoder 204 performs decoding corresponding to the coding by the convolutional coder and outputs maximum likely data as Viterbi decoded data.

In the conventional modulation-demodulation circuit including error correction, the demodulation circuit therein supplies, in error correction, information of the maximum likelihood from the demodulator to the error correction unit with not only the demodulator but also characteristics of error correction taken into consideration. In short, the demodulation unit and the error correction unit individually perform optimization separately from each other.

However, for conventional modulation-demodulation circuits including error correction based on convolutional coding and Viterbi decoding, various demodulation algorithms have been investigated and developed to improve the characteristics in error correction. For the demodulation circuit for the modulation-demodulation circuits, efforts are directed to improve the performance with not only the demodulator but also the characteristics in error correction take into consideration. Upon maximum likelihood decoding by which a Viterbi algorithm is used to decode maximum likely data from a convolutional signal in error correction, information of the likelihood is transmitted from the demodulator to the Viterbi decoder including error correction.

SUMMARY OF THE INVENTION

It is an object of the present invention to provide a demodulation circuit including error correction based on convolution coding and Viterbi decoding by which the characteristic of error correction is further improved.

According to an aspect of the present invention, there is provided a demodulation circuit including error correction which includes means for demodulating a burst data signal received in a satellite communication channel having a low carrier power to noise power ratio using reference bits, means for removing the reference bits from the demodulated burst data, means for deinterleaving the burst data, from which the reference bits have been removed, in accordance with specifications, and means for Viterbi decoding the convolutionally coded burst data, characterized in that it comprises means for weighting each value of the demodulated burst data in accordance with the distance from the reference bits of the burst data.

According to another aspect of the present invention, there is provided a demodulation circuit including error correction for a satellite communication channel having a low carrier power to noise power ratio, comprising a demodulation circuit unit for demodulating a received burst data signal using reference bits, a data extraction unit for removing the reference bits from the demodulated burst data, a weighting unit for weighting each value of the extracted burst data in accordance with the distance from the reference bits of the burst data, a deinterleave unit for deinterleaving the weighted burst data in accordance with specifications, and an error correction unit for Viterbi decoding the convolutionally coded burst data.

According to a further aspect of the present invention, there is provided a demodulation circuit including error correction for a satellite communication channel having a low carrier power to noise power ratio, comprising, a demodulation circuit unit for demodulating a received burst data signal using reference bits, a weighting unit for weighting each value of the demodulated burst data in accordance with the distance from the reference bits of the burst data, a data extraction unit for removing the reference bits from the burst data which have been weighted, a deinterleave unit for deinterleaving the data, from which the reference bits have been removed, in accordance with specifications, and an error correction unit for Viterbi decoding the convolutionally coded deinterleaved burst data.

According to the present invention, a data signal produced by adding reference bits to burst data at suitable intervals in a data format of a fixed length is weighted, after demodulated, with a likelihood of demodulation which varies in proportion to the distance from the reference signal, and as a result, an advantage that improvement in error correction capacity can be achieved is provided.

As an actual example, error correction was performed after weighting burst data with a weight at a fixed rate such that a maximum weight was applied to a burst data just adjacent the reference bits whereas a minimum weight was applied to another burst data farthest from the reference bits. The BER (Bit Error Ratio) then was, when a test was performed for 200 bursts under Rice fading, $1.302\ e^{-2}$ whereas the BER prior to the error correction was $8.411\ e^{-2}$, and error was successfully decreased by 92.6% when compared with the BER $1.406\ e^{-2}$ obtained without applying any weight.

DESCRIPTION OF THE PREFERRED EMBODIMENTS

Figure 1:
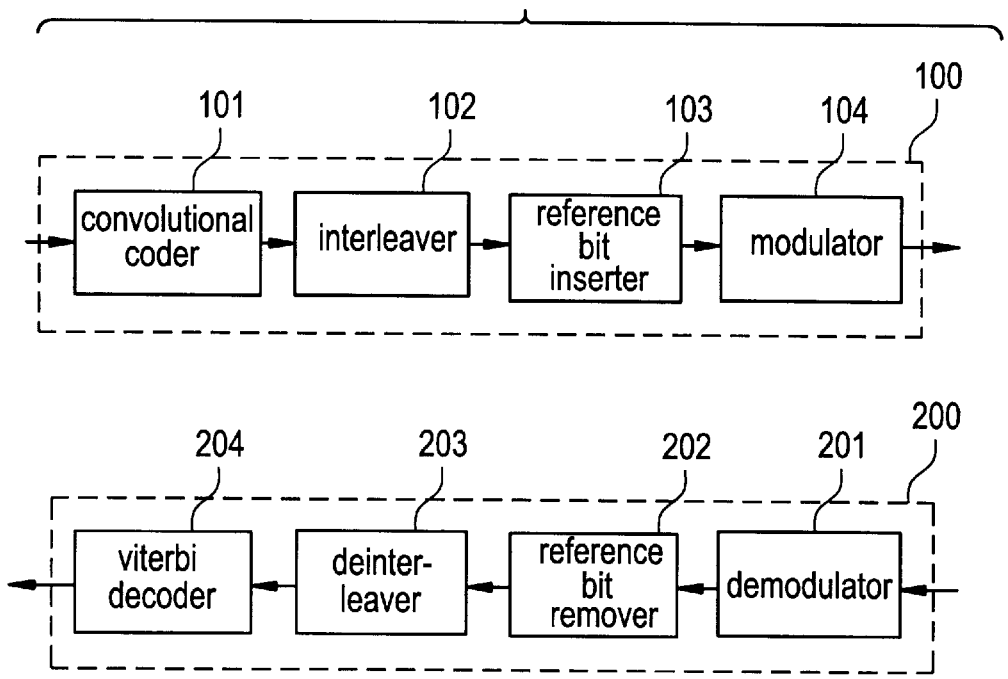
FIG. 1 is a block diagram showing a construction of a conventional example.
Figure 2:
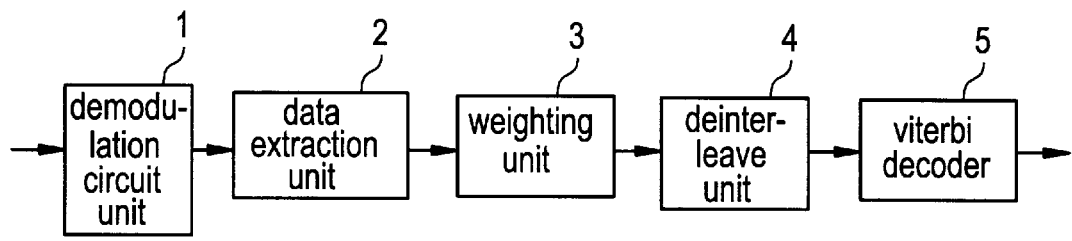
FIG. 2 is a block diagram showing a construction of an embodiment of the present invention.
Figure 3:
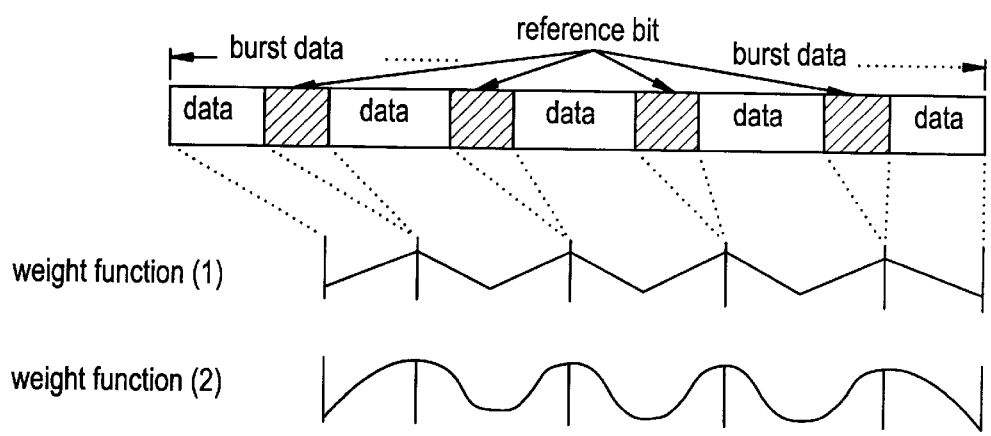
FIG. 3 is a diagrammatic view illustrating a construction of burst data and a weight function of the embodiment of the present invention.

In the following, embodiments of the present invention are described with reference to the drawings. FIG. 2 is a block diagram showing a construction of an embodiment of the present invention. FIG. 3 is a diagrammatic view illustrating a construction of burst data and a weight function of the embodiment of the present invention.

As shown in FIG. 2, a demodulation circuit including error correction according to the present invention includes demodulation circuit unit 1 for demodulating a received signal using reference bits, data extraction unit 2 for removing the reference bits and guard bits, weighting unit 3 for weighting in proportion to a distance from the reference bits, deinterleave unit 4 for deinterleaving data in accordance with specifications, and Viterbi decoder 5 which performs forward error correction (FEC).

A burst data signal to be inputted to the demodulation circuit including error correction according to the present invention is convolutionally coded by a convolutional coder of a modulation circuit and interleaved in accordance with specifications by an interleaver. The interleaved burst data signal is delimited at predetermined intervals in accordance with specifications in order to assure a high degree of accuracy in demodulation of a received signal and reference bits are inserted as reference information to the phase and the amplitude into the burst data signal by a reference bit inserter. The burst data signal is a burst data signal which is to be, for example, BPSK modulated by a modulator and outputted as a transmission signal. The burst data of the present invention is such a data signal wherein reference bits are added at suitable data intervals to a data format of a fixed length as seen in FIG. 3.

Now, operation of the demodulation circuit including error correction according to the present invention is described with reference to FIG. 2.

Demodulation circuit unit 1 demodulates a received burst data signal in accordance with a demodulation method corresponding to the modulation method using the reference bits. Data extraction unit 2 stores the positions of the reference bits from the demodulated burst data and removes the reference bits to extract the burst data. Weighting unit 3 weights each value of the extracted burst data in accordance with the distance from the reference bits of the burst data with a likelihood of demodulation which varies in proportion to the distance from the reference signal. Deinterleave unit 4 performs deinterleaving which returns the order of the weighted data to the original one in accordance with the interleave specifications of the modulator. Error correction unit 5 Viterbi decodes the convolutionally coded burst data and outputs resulting data.

Here, the reference bits inserted as reference information to the phase and the amplitude at predetermined intervals in the burst data are fixed bits inserted in the burst signal. The pattern of the reference bits is determined in advance, and there is no particular limitation to the predetermined interval value. Upon demodulation on the reception side, the burst signal is demodulated so as to increase the correlation between the reference bit sets. In other words, the burst signal is demodulated with reference to the phase and the amplitude thereof at each set of the reference bits. Consequently, the burst signal is weighted such that it can be demodulated with a higher degree of accuracy toward the reference bits even if the phase of the signal varies by a large amount within one burst.

In the demodulation circuit, since the burst signal is demodulated with reference to the phase of the reference bits, it is considered that modulation is comparatively accurate in the proximity of the reference bits. The demodulation circuit multiplies a weight which increases in proportion to the distance from the reference bits to obtain data whose likelihood increases toward the reference bits. The demodulation circuit achieves improvement in error correction capacity by transmitting the data to the error correction unit which performs Viterbi decoding.

While an example of a burst format is illustrated in FIG. 3, it is effective to all demodulators which demodulate using reference bits. For example, the demodulator may be a demodulation circuit unit which demodulates a received burst data signal, which has been modulated in accordance with a two-phase phase-shift modulation method, in accordance with a two-phase phase-shift demodulation method using reference bits. Alternatively, the demodulator may be a demodulation circuit unit which demodulates a received burst data signal, which has been modulated in accordance with a four-phase phase-shift modulation method, in accordance with a four-phase phase-shift demodulation method using reference bits.

Figure 4:
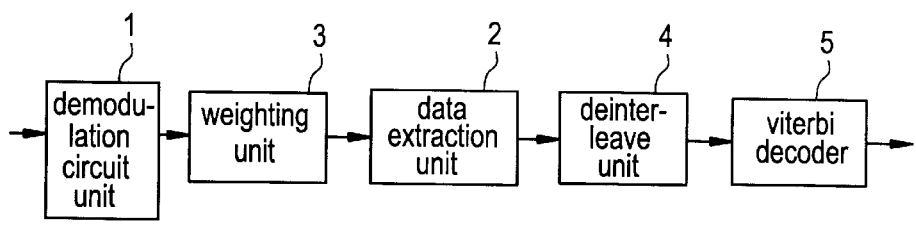
FIG. 4 is a block diagram showing a construction of another embodiment of the present invention.

Now, another embodiment of the present invention is described in detail with reference to the drawing. FIG. 4 is a block diagram showing a construction of the second embodiment of the present invention.

Referring to FIG. 4, a demodulation circuit including error correction according to the present invention includes demodulation circuit unit 1 for demodulating a received signal using reference bits, weighting unit 3 for weighting in proportion to the distance from the reference bits, data extraction unit 2 for removing the reference bits and guard bits, deinterleave unit 4 for deinterleaving the burst data in accordance with specifications, and Viterbi decoder 5 which performs forward error correction (FEC).

The demodulation circuit including error correction shown in FIG. 4 has a construction wherein, when compared with the demodulation circuit including error correction shown in FIG. 2, the order of data extraction unit 2 and weighting unit 3 is reversed, but is same in function.

Further, in FIG. 2, weighting unit 3 may be included in demodulation circuit unit 1. Also, in FIG. 4, weighting unit 3 may be included in demodulation circuit unit 1.

Further, while weighting is performed at a fixed rate as an example of weighting, the weight is required only to have a monotonously decreasing value with respect to the distance from the reference bits. (However, the characteristic may vary significantly depending upon the shape of the weight function.)

For example, as seen from weight function (1) of FIG. 3, the weighting of the burst data value in accordance with the distance from the reference bits may be performed by weighting the burst data value by multiplying the burst data value by a weight coefficient which decreases linearly as the distance from the reference bits increases between adjacent sets of the reference bits. Alternatively, weighting may be performed by multiplying the burst data value by another weight coefficient which decreases in accordance with a particular function as indicated by weight function (2) of FIG. 3.

Further, the satellite communication channel is required only to be a model wherein a burst data signal received exhibits a variation in phase or amplitude, and may be a communication channel of the Rice fading type which includes direct waves from a satellite or a communication channel of the Rayleigh fading type which does not include direct waves from a satellite.

What is claimed is:

1. A demodulation circuit including error correction, comprising:
    means for demodulating a burst data signal received in a satellite communication channel having a low carrier power to noise power ratio using reference bits;
    means for weighting each value of the demodulated burst data in accordance with the distance from the reference bits of the burst data;
    means for removing the reference bits from the burst data which have been weighted;
    means for deinterleaving the burst data, from which the reference bits have been removed, in accordance with specifications; and
    means for Viterbi decoding a convolutionally coded burst data.

2. A demodulation circuit including error correction as claimed in claim 1, wherein said means for weighting each value of the demodulated burst data in accordance with the distance from the reference bits of the burst data weights each of the burst data values by multiplying the burst data value by a weight coefficient which decreases linearly as the distance from the reference bits increases between adjacent reference bits.

3. A demodulation circuit including error correction as claimed in claim 1, wherein said means for weighting each value of the demodulated burst data in accordance with the distance from the reference bits of the burst data weights each of the burst data values by multiplying the burst data value by a weight coefficient which decreases in accordance with a particular function as the distance from the reference bits increases between adjacent reference bits.

4. A demodulation circuit including error correction as claimed in claim 1, wherein said satellite communication channel having a low carrier power to noise power ratio is a communication channel of the Rice fading type which includes direct waves from a satellite.

5. A demodulation circuit including error correction as claimed in claim 1, wherein said satellite communication channel having a low carrier power to noise power ratio is a communication channel of the Rayleigh fading type which does not include direct waves from a satellite.

6. A demodulation circuit including error correction, comprising:
    a demodulation circuit unit for demodulating a burst data signal received in a satellite communication channel having a low carrier power to noise power ratio using reference bits;
    a data extraction unit for removing the reference bits from the demodulated burst data;
    a weighting unit for weighting each value of the extracted burst data in accordance with the distance from the reference bits of the burst data;
    a deinterleave unit for deinterleaving the weighted burst data in accordance with specifications; and
    an error correction unit for Viterbi decoding a convolutionally coded burst data.

7. A demodulation circuit including error correction as claimed in claim 6, wherein said demodulation circuit unit for demodulating a burst data signal received using reference bits is a demodulation circuit unit which demodulates, using the reference bits, the received burst data signal, which has been modulated in accordance with a two-phase phase-shift modulation method, in accordance with a two-phase phase-shift demodulation method.

8. A demodulation circuit including error correction as claimed in claim 6, wherein said demodulation circuit unit for demodulating a burst data signal received using reference bits is a demodulation circuit unit which demodulates, using the reference bits, the received burst data signal, which has been modulated in accordance with a four-phase phase-shift modulation method, in accordance with a four-phase phase-shift demodulation method.

9. A demodulation circuit including error correction as claimed in claim 6, wherein said weighting unit for weighting each value of the extracted burst data weights the burst data value by multiplying the burst data value by a weight coefficient which decreases linearly as the distance from the reference bits increases between adjacent reference bits.

10. A demodulation circuit including error correction as claimed in claim 6, wherein said weighting unit for weighting each value of the extracted burst data weights the burst data value by multiplying the burst data value by a weight coefficient which decreases in accordance with a particular function as the distance from the reference bits increases between adjacent reference bits.

11. A demodulation circuit including error correction as claimed in claim 6, wherein said satellite communication channel having a low carrier power to noise power ratio is a communication channel of the Rice fading type which includes direct waves from a satellite.

12. A demodulation circuit including error correction as claimed in claim 6, wherein said satellite communication channel having a low carrier power to noise power ratio is a communication channel of the Rayleigh fading type which does not include direct waves from a satellite.

13. A demodulation circuit including error correction, comprising:
    a demodulation circuit unit for demodulating a burst data signal received in a satellite communication channel having a low carrier power to noise power ratio using reference bits;
    a weighting unit for weighting each value of the demodulated burst data in accordance with the distance from the reference bits of the burst data;
    a data extraction unit for removing the reference bits from the burst data which have been weighted;
    a deinterleave unit for deinterleaving the data, from which the reference bits have been removed, in accordance with specifications; and an error correction unit for Viterbi decoding a convolutionally coded deinterleaved burst data.

14. A demodulation circuit including error correction as claimed in claim 13, wherein said demodulation circuit unit for demodulating a burst data signal received using reference bits is a demodulation circuit unit which demodulates, using the reference bits, the received burst data signal, which has been modulated in accordance with a two-phase phase-shift modulation method, in accordance with a two-phase phase-shift demodulation method.

15. A demodulation circuit including error correction as claimed in claim 13, wherein said demodulation circuit unit for demodulating a burst data signal received using reference bits is a demodulation circuit unit which demodulates, using the reference bits, the received burst data signal, which has been modulated in accordance with a four-phase phase-shift modulation method, in accordance with a four-phase phase-shift demodulation method.

16. A demodulation circuit including error correction as claimed in claim 13, wherein said weighting unit for weighting each value of the extracted burst data weights the burst data value by multiplying the burst data value by a weight coefficient which decreases linearly as the distance from the reference bits increases between adjacent reference bits.

17. A demodulation circuit including error correction as claimed in claim 13, wherein said weighting unit for weighting each value of the extracted burst data weights the burst data value by multiplying the burst data value by a weight coefficient which decreases in accordance with a particular function as the distance from the reference bits increases between adjacent reference bits.

18. A demodulation circuit including error correction as claimed in claim 13, wherein said satellite communication channel having a low carrier power to noise power ratio is a communication channel of the Rice fading type which includes direct waves from a satellite.

19. A demodulation circuit including error correction as claimed in claim 13, wherein said satellite communication channel having a low carrier power to noise power ratio is a communication channel of the Rayleigh fading type which does not include direct waves from a satellite.

* * * * *